(12) United States Patent
Gorohata et al.

(10) Patent No.: US 7,343,662 B2
(45) Date of Patent: Mar. 18, 2008

(54) MANUFACTURING METHOD OF STATOR COIL COMPOSED OF CONDUCTOR SEGMENTS

(75) Inventors: Tetsuya Gorohata, Anjo (JP); Masaru Sugiyama, Okazaki (JP)

(73) Assignee: Denso Corporation, Kariya (JP)

( * ) Notice: Subject to any disclaimer, the term of this patent is extended or adjusted under 35 U.S.C. 154(b) by 442 days.

(21) Appl. No.: 10/939,386

(22) Filed: Sep. 14, 2004

(65) Prior Publication Data

US 2005/0081365 A1  Apr. 21, 2005

(30) Foreign Application Priority Data

Sep. 18, 2003  (JP)  ............... 2003-326574

(51) Int. Cl.
*H02K 15/00*  (2006.01)

(52) U.S. Cl. .......... 29/596; 29/564.1; 29/598; 29/605; 29/606; 29/732; 140/102.5

(58) Field of Classification Search ........ 29/596, 29/564.1, 598, 605, 606, 732; 140/102.5; 310/179, 201
See application file for complete search history.

(56) References Cited

U.S. PATENT DOCUMENTS 6,177,747 B1  1/2001  Maeda et al.
6,249,956 B1  6/2001  Maeda et al.
6,314,780 B1  11/2001  Naka et al.
6,441,527 B1  8/2002  Taji et al.
6,530,140 B2  3/2003  Maeda et al.
2001/0013167 A1  8/2001  Maeda et al.

FOREIGN PATENT DOCUMENTS

JP  A 2001-78404  7/2001
JP  A 2001-231203  8/2001

*Primary Examiner*—Thiem D. Phan
(74) *Attorney, Agent, or Firm*—Oliff & Berridge, PLC (57) ABSTRACT

In manufacturing a stator coil for a rotary electric machine, a U-shaped segment is deformed at the turn portion thereof so that one of two straight portions thereof moves against the other one in a direction generally perpendicular to a borderline which connects two bordering points between the straight portions and the turn portion. The segment is twisted by moving the straight portions apart from each other. The segment is inserted into slots formed in a stator core so that the turn portion and end portions of the straight portions protrude from both axial end surfaces of the stator core. The end portions are folded in the circumferential direction of the stator core. The tips of the end portions are connected to tips of other segments.

11 Claims, 13 Drawing Sheets

MANUFACTURING METHOD OF STATOR COIL COMPOSED OF CONDUCTOR SEGMENTS

CROSS REFERENCE TO RELATED APPLICATIONS

This application is based upon and claims the benefit of priority of Japanese Patent Application No. 2003-326574 filed on Sep. 18, 2003, the contents of which are incorporated herein by reference.

FIELD OF THE INVENTION

The present invention relates to a manufacturing method of a stator coil composed of conductor segments for a rotary electric machine used as an electric motor and/or a generator equipped in vehicles.

BACKGROUND OF THE INVENTION

A conventional rotary electric machine comprises a stator coil formed by connecting sequentially a plurality of U-shaped conductor segments which are respectively inserted into slots provided in a stator core (for example, refer to U.S. Pat. Nos. 6,249,956B and 6,530,140B corresponding to JP3118837B, called Reference 1 hereinafter).

Each of the U-shaped segments of this rotary electric machine is set to an annular twisting tool in the state that straight portions of the U-shaped segments are arranged in a radial direction of the twisting tool, and a pair of the straight portions of each U-shaped segment are sheared inversely to each other along a circumference of the twisting tool, before the U-shaped segment is inserted into the slot. These twisted U-shaped segments are inserted into the slots of the stator core, and tip portions of these U-shaped segments protruding from the stator core are folded in the circumferential direction of the stator core, then are connected to each other to form a stator coil having a predetermined winding specification.

As a method to manufacture the U-shaped segment described above, it is known to cut a single wire rod into predetermined length and to bend the rods into U-shapes (for example, refer to U.S. Pat. No. 6,314,780B corresponding to JP2001-045721A, called Reference 2 hereinafter). In this method, an excessive bending preventer retains a turn portion in bending the rod, so as to prevent excessive bending and fractures of the insulation coating on the wire.

In the case that the U-shaped segments are manufactured by the method disclosed in Reference 2, the width of the U-shaped segment extends at the turn portion thereof by the size of the excessive bending preventer. Therefore, if a number of the U-shaped segments are inserted into one slot of the stator core, an end portion of the stator coil composed of the turn portion bulges in a radial direction of the stator. For example, in the case that a part of the stator coil is composed of four large and small U-shaped segments arranged in the radial direction of the stator, the size of the turn portion of each U-shaped segment is larger than that of the straight portion in the radial direction. Thus, if the straight portions are inserted in the slot to occupy most of the space therein (if the straight portions are installed in the slot in a radial direction of the stator so that the clearance therein is quite small), the turn portion bulge in the radial direction to center (or to perimeter) of the stator.

If it is prevented to interfere the projecting turn portion with the frame arranged around them (or with a rotor arranged inside of the stator), it becomes difficult to make the rotary electric machine in a small size. To incline the laminated turn portion to the radial direction of the stator, it is required to add a step to bend the turn portion, and the manufacturing step becomes complicated and undesirable.

It is thought to reduce the bulging volume by shifting the turn positions of four U-shaped segments in the inserting direction thereof from each other. In this case, however, it becomes difficult to make the rotary electric machine short in the direction of rotating axis, and electrical resistances of the U-shaped segments are dispersed. Thus, it is also difficult to adopt this method.

SUMMARY OF THE INVENTION

In view of the above issues, the object of the present invention is to provide a manufacturing method of a stator coil composed of conductor segments and a stator coil for a rotary electric machine which can restrict bulging of the end portion of the stator coil in the radial direction thereof.

To achieve the above object, the manufacturing method of a stator coil composed of conductor segments of present invention comprises steps of deforming, twisting, inserting, folding and connecting.

In the deforming step, a U-shaped segment, having two straight portions which are generally straight and a turn portion between the straight portions which curves throughout its length, is deformed at the turn portion thereof so that one of the straight portion moves against the other straight portion in a direction generally perpendicular to a borderline connecting two bordering points between the straight portions and the turn portion. In the twisting step, the segment is twisted by moving two straight portions thereof apart from each other. In the inserting step, the segment is inserted into slots formed radially in a stator core at a constant angular interval along the circumference thereof so that the turn portion and end portions of the straight portions protrude from both axial end surfaces of the stator core. In the folding step, the end portions are folded generally in the circumferential direction of the stator core. In the connecting step, tips of the end portions are connected to tips of other segments.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

In the following, an embodiment of a rotary electric machine of the present invention is described in detail with reference to the drawings.

Figure 1:
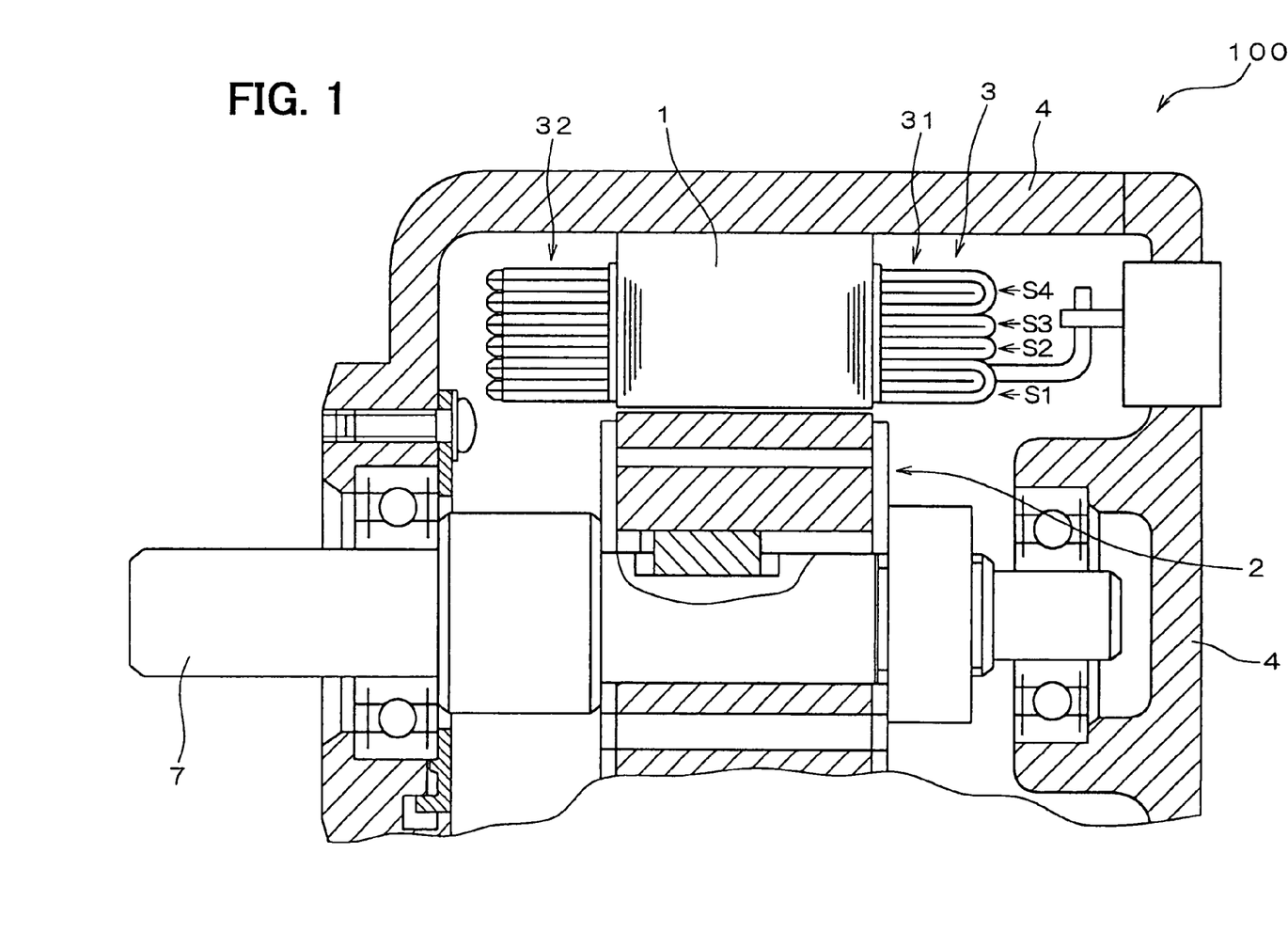
FIG. 1 is a vertical sectional view of a driving motor used for generating driving power of a vehicle which is an embodiment of the present invention.

As shown in FIG. 1, a driving motor 100 comprises a stator core 1, a rotor 2, a stator coil 3, a housing 4, and a rotor shaft 7. The stator core 1 is fixed on the internal circumference of the housing 4. The stator coil 3 is installed windingly in each slot provided in the stator core 1. The rotor 2 is an IPM (Interior Permanent Magnet) rotor fixed on the rotor shaft 7 which is pivotally supported by the housing 4, and arranged radially inside of the stator core 1. The stator coil 3 is a three-phase armature coil and provided with electricity from a three-phase inverter connected to an external 300V battery.

This driving motor 100 is a permanent magnet type three-phase brushless DC motor (a synchronous motor) generating a driving power for a secondary battery vehicle, a fuel cell vehicle, or a hybrid electric vehicle. The rotor structure can be substituted by other kinds of known forms. These kinds of synchronous machines are well known and whose detailed operating principles are not described here.

Figure 2:
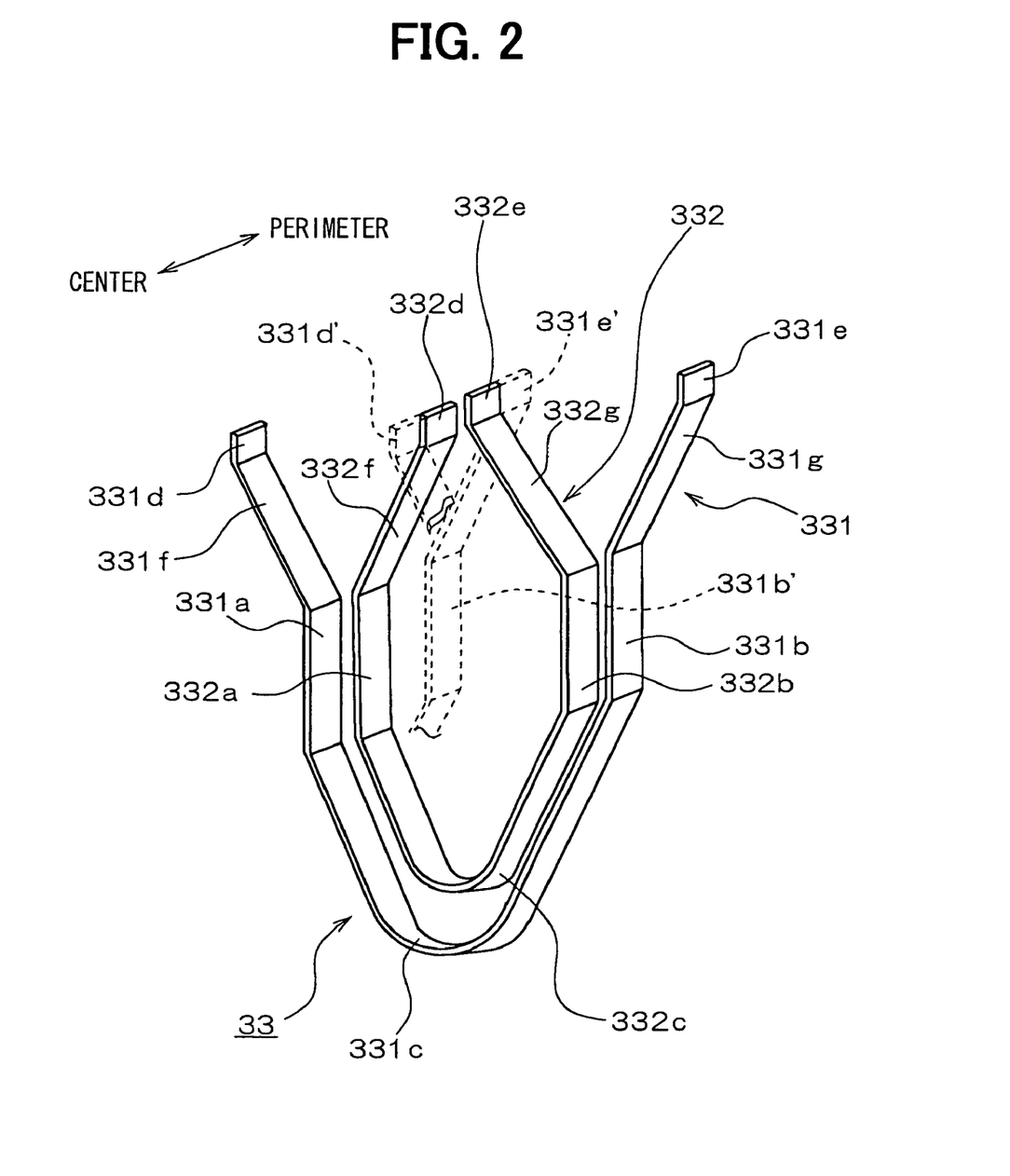
FIG. 2 is a perspective view of segments composing a part of a stator coil.

The stator coil 3 is composed by inserting conductor segments 33 formed in a predetermined shape shown in FIG. 2 into respective slots from one axial side surface of the stator core 1, making end portions of the segments 33 protrude from the slots at another side of the stator core 1 by a required length, twisting the end portions by the angle of $2/\pi$ in electrical angle in the direction along with the stator circumference, and welding the tips of the end portions of the segments 33 in a predetermined combination. Each of the segments 33 is a U-shaped plate rod whose surface is covered with a plastic coating (an insulating coating) except for the connecting parts, or the tips of the end portions described above.

As shown in FIG. 1, in the stator coil 3, each of two segment sets S1, S4, which are arranged at the most interior and exterior position in one slot 35 respectively, has a structure 33 having a large segment 331 and a small segment 332 shown in FIG. 2. Each of the segment sets S2, S3, which are arranged between the segment sets S1, S4 in the slot 35, has a structure composed of one segment 33. The small segment 332 surrounded by the large segment 331.

The large segment 331 has a pair of in-slot conductor portions 331a, 331b, a turn portion 331c, and a pair of end portions 331f, 331g. The turn portion 331c is between the in-slot conductor portions 331a, 331b, and the end portions 331f, 331g are opposite to the turn portion 331c. The small segment 332 has a pair of in-slot conductor portions 332a, 332b, a turn portion 332c, and a pair of end portions 332f, 332g. The tips 332d, 332e, 332d, 332e of the end portions 331f, 331g, 332f, 332g are the connecting parts for the connection between the segments.

Figure 4:
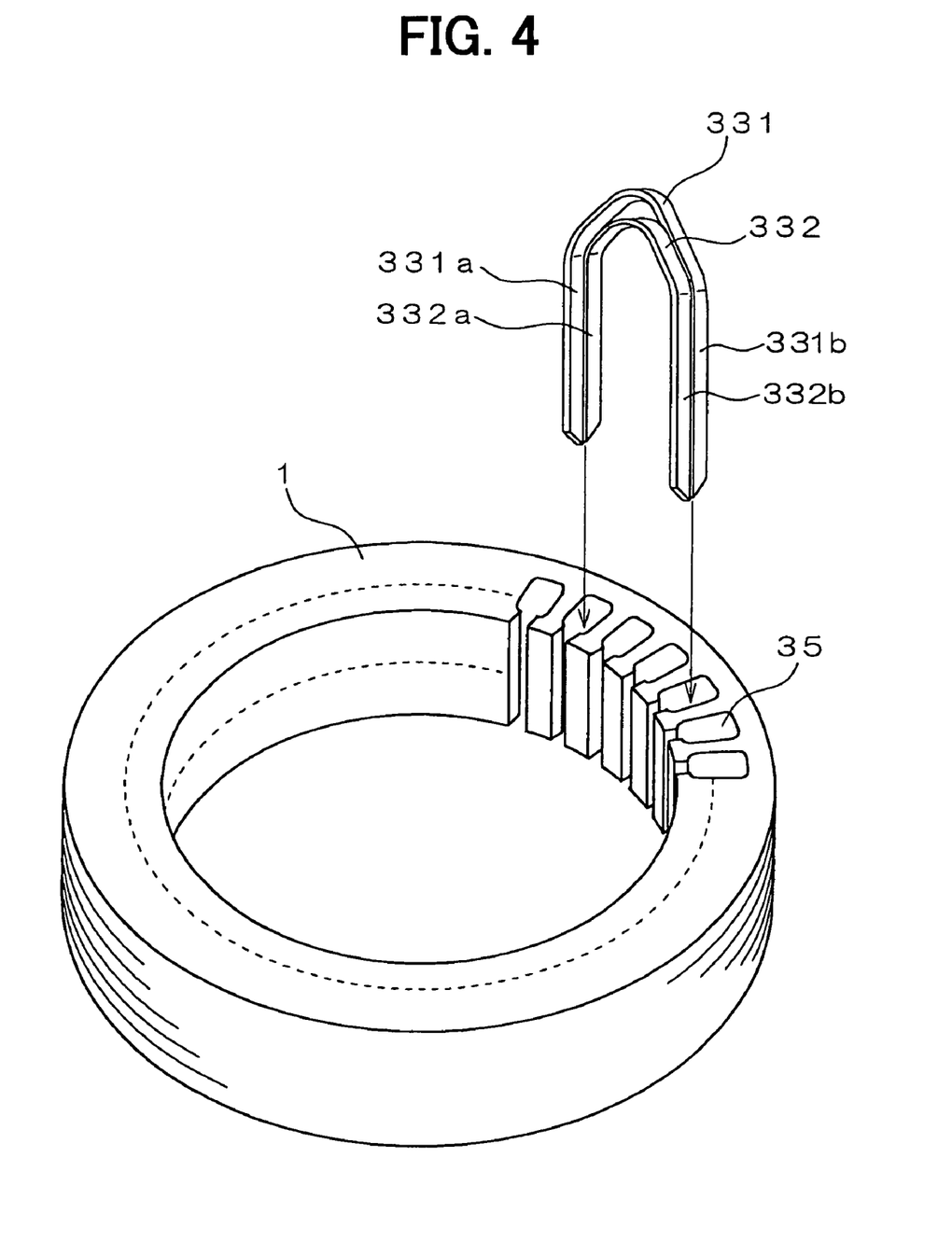
FIG. 4 is a perspective view showing an inserting state of a segment set composed of a large and a small segments into slots.

The end portions 331f, 331g, 332f, 332g are not formed in the segments 331, 332 before the segments 331, 332 are inserted in the slots 35 as shown in FIGS. 4. The portions corresponding to the in-slot conductor portions 331a, 331b, 332a, 332b and the end portions 331f, 331g, 332f, 332g are straight portions before being inserted in the slots 35.

The stator coil 3 is segmented to a head-turned protruding portion 31, a tip-connected protruding portion 32, and a in-slot portion as shown in FIG. 1. The head-turned protruding portion 31 is composed of the turn portions 331c, 332c of the segments 331, 332 (33), and the tip-connected protruding portion 32 is composed of the end portions 331f, 331g, 332f, 332g of the segments 331, 332.

In the reference numerals, the number attached apostrophe—'—means an equivalent part assigned the same number without apostrophe in the large and the small segments 331, 332 not shown in FIG. 2. The tips 332d, 331d' adjacent in the radial direction are welded to each other, and tips 332e, 331e' adjacent in the radial direction are welded to each other.

The in-slot conductor portions 331a, 332a are inserted into one slot 35 of the stator core 1, and the in-slot conductor portions 331b, 332b of the same large and small segments 331, 332 are inserted into another slot 35 of the stator core 1 that is apart from the one slot 35 by an odd number(s) of magnetic pole pitch (for example, one magnetic pole pitch ($\pi$ in electric angle)).

Figure 3:
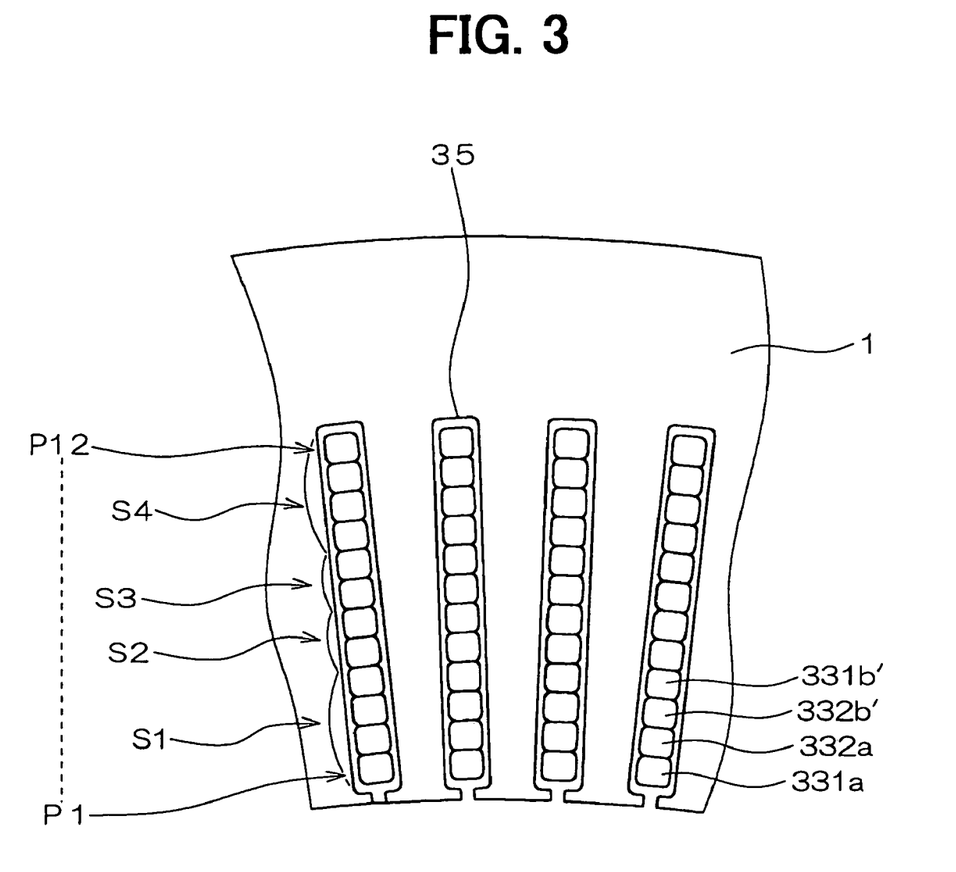
FIG. 3 is a partial sectional view showing an installing state of the segments in slots provided in a stator coil.

The arrangement of the segments in each slot of the stator core 1 is described referring to FIG. 3. Each slot 35 is assigned twelve conductor-installing positions P1 to P12 along the radial direction. In each of the conductor-installing positions P1 to P12, one in-slot conductor portion is installed respectively. Each slot 35 holds four segment sets S1 to S4 sequentially in the radial direction. The conductor-installing positions P1 to P4 hold the segment set S1, the conductor-installing positions P5, P6 hold the segment set S2, the conductor-installing positions P7, P8 hold the segment set S3, and the conductor-installing positions P9 to P12 hold the segment set S4.

The segment set S1 positioned most internally is described in detail as an example. The in-slot conductor portion 331a is arranged in the conductor-installing position P1 in the slots 35. The in-slot conductor portions 332a, 332b', 331b' are arranged sequentially in the conductor-installing positions P2 to P4 in the slots 35. That is, each slot 35 installs these four in-slot conductor portions 331a, 332a, 332b', 331b' as four layers in a row. The in-slot conductor portions 331b', 332b' belong to a large and a small segments 331, 332 other than the large and the small segments 331, 332 having the in-slot conductor portions 331a, 332a. The segment set S4 is arranged in the same manner as described above. Other segment sets S2, S3 has an arrangement where only a segment 33 (for example a small segment 332) is removed from the arrangement described above. FIG. 4 shows the state where the segment set S1 composed of the large and the small segments 331, 332 are inserted into the slots 35.

In the following, the manufacturing step of the stator coil 3 is described.

(Bending Step)

Figure 5:
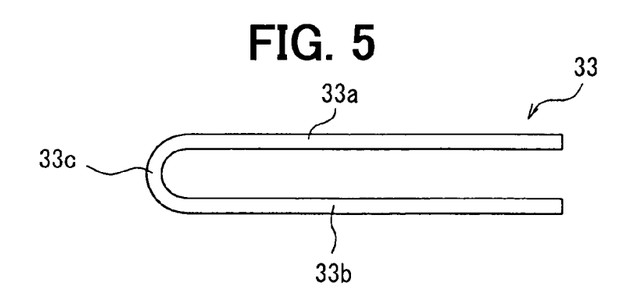
FIG. 5 is a front view of a U-shaped segment manufactured by folding step.
Figure 6:
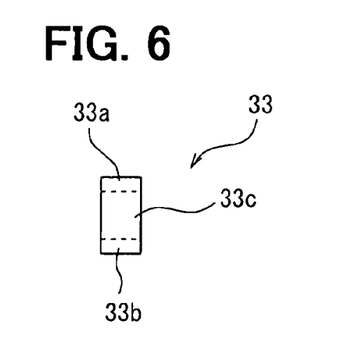
FIG. 6 is a side view of the segment shown in FIG. 5.
Figure 7:
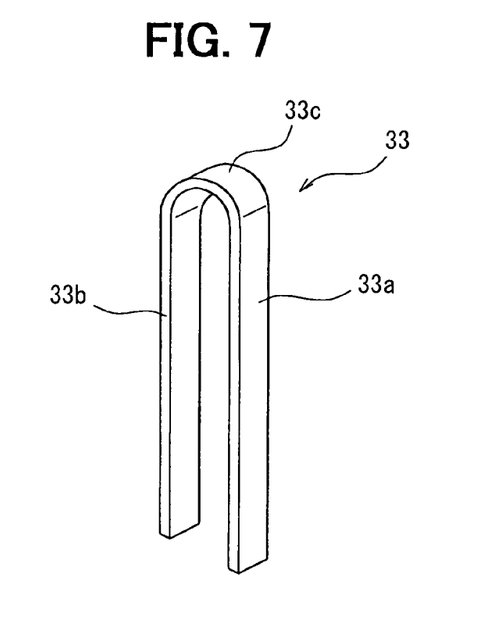
FIG. 7 is a perspective view of the segment shown in FIG. 5.

FIG. 5, 6, 7 are a front view, a side view, and a perspective view of the U-shaped segment processed in the bending step. At first, a wire having a rectangular section is cut into rods with given length and the rods are bent generally at the middle thereof to be a U-shaped segment composing each of the segment sets S1 to S4. As shown in these Figs., the U-shaped segment 33 has a turn portion 33c (331c, 332c) between two straight portions 33a, 33b.

(Deforming Step)

Next, each of the segments 33 bent in the U-shape in the bending step is twisted at the turn portion 33c thereof in deforming step. The direction in which two straight portions 33a, 33b are arranged is called a first direction. The turn portion 33c is twisted by shifting each of the straight portions 33a, 33b relatively apart from each other along a second direction different from the first direction.

Figure 8:
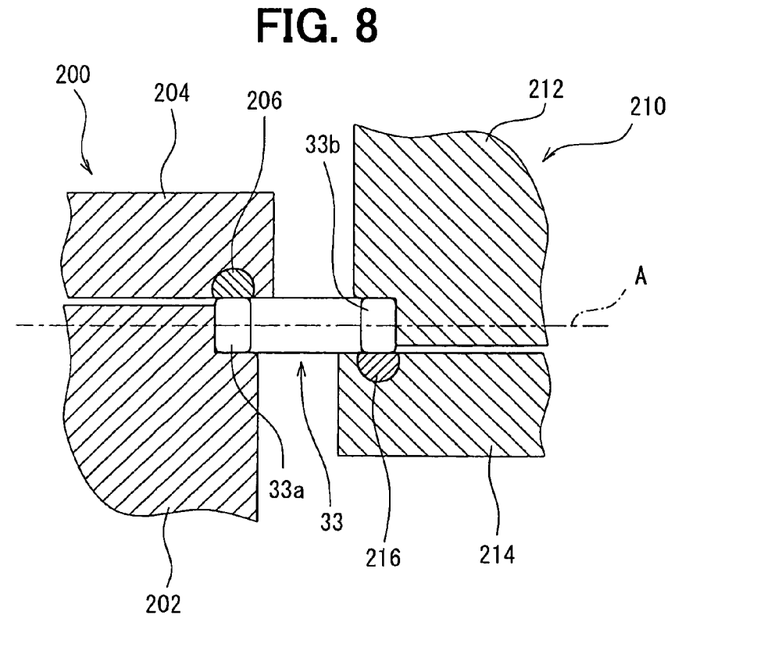
FIG. 8 is a sectional view showing the detail of a deforming step.
Figure 9:
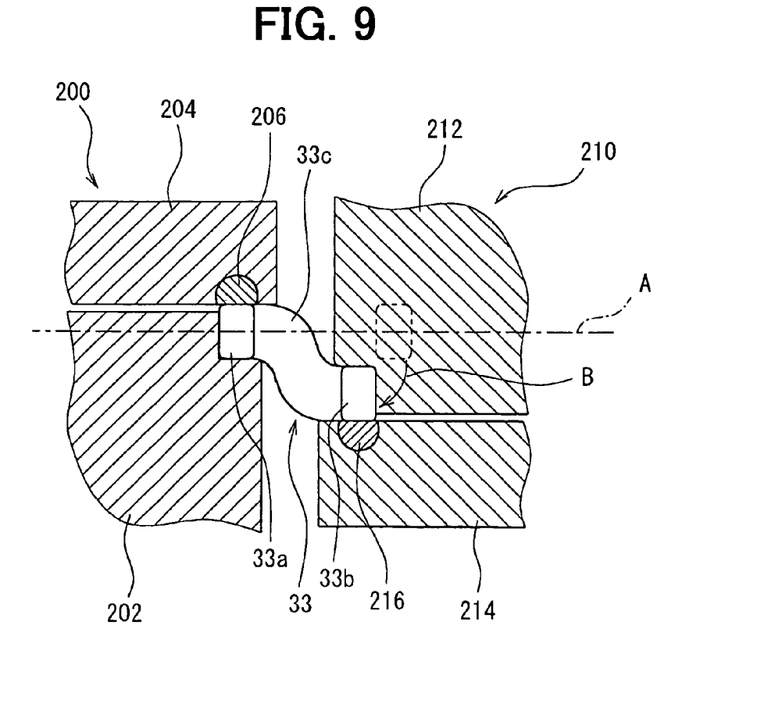
FIG. 9 is a sectional view showing the detail of the deforming step.

FIGS. 8 and 9 show the details of the deforming step, in which the states before and after the twist shaping using a twisting tool are shown. The deforming step is executed by the twisting tool having a fixed damper 200 and a movable damper 210. The fixed damper 200 comprises an installing unit 202, a moving unit 204 and a fitting unit 206. The installing unit 202 is provided at a part thereof with a concavity for holding one straight portion 33a of the segment 33. The straight portion 33a is installed onto the installing unit 202 so that the two side surfaces thereof adjacent to each other comes in contact with this concavity. The moving unit 204 keeps at a side surface thereof pivotally the fitting unit 206 shaped cylindrically and having a flat surface on the side thereof. By pushing the flat surface onto the side of the straight portion 33a, the installing unit 202 and the moving unit 204 holds the straight portion 33a. By comprising the pivotally moving fitting unit 206, it becomes possible to adjust the flat surface of the fitting unit 206 parallel to the side surface of the straight portion 33a, and the straight portion 33a is securely held.

Similarly, the movable damper 210 comprises an installing unit 212, a moving unit 214 and a fitting unit 216. The installing unit 212 is provided at a part thereof with a concavity for holding another straight portion 33b of the segment 33. The straight portion 33b is installed onto the installing unit 212 so that the two side surfaces thereof adjacent to each other comes in contact with this concavity. The moving unit 214 keeps at a side surface thereof pivotally the fitting unit 216 shaped cylindrically and having a flat surface on the side thereof. By pushing the flat surface onto the side of the straight portion 33b, the installing unit 212 and the moving unit 214 hold the other straight portion 33b. By providing the pivotally moving fitting unit 216, it becomes possible to adjust the flat surface of the fitting unit 216 parallel to the side surface of the straight portion 33b, and the straight portion 33b is securely held.

The movable damper 210 is configured to move as a single body. As shown in FIGS. 8 and 9, the movable damper 210 moves in the second direction B, downward and leftward generally perpendicular to the first direction A. Accordingly, the two straight portions 33a, 33b, which are held by the fixed damper 200 and the movable damper 210, are shifted relative to each other generally perpendicular to the first direction A, and the turn portion 33c is twisted. The two straight portions 33a, 33b are shifted from each other by the distance of one pitch of the arrangement of the slots 35 in the first direction A. In the deforming step, the displacement of shifting each of the straight portions 33a, 33b of the segment 33 in the radial direction is set generally equal to the width of the segment 33 in the radial direction.

Figure 10:
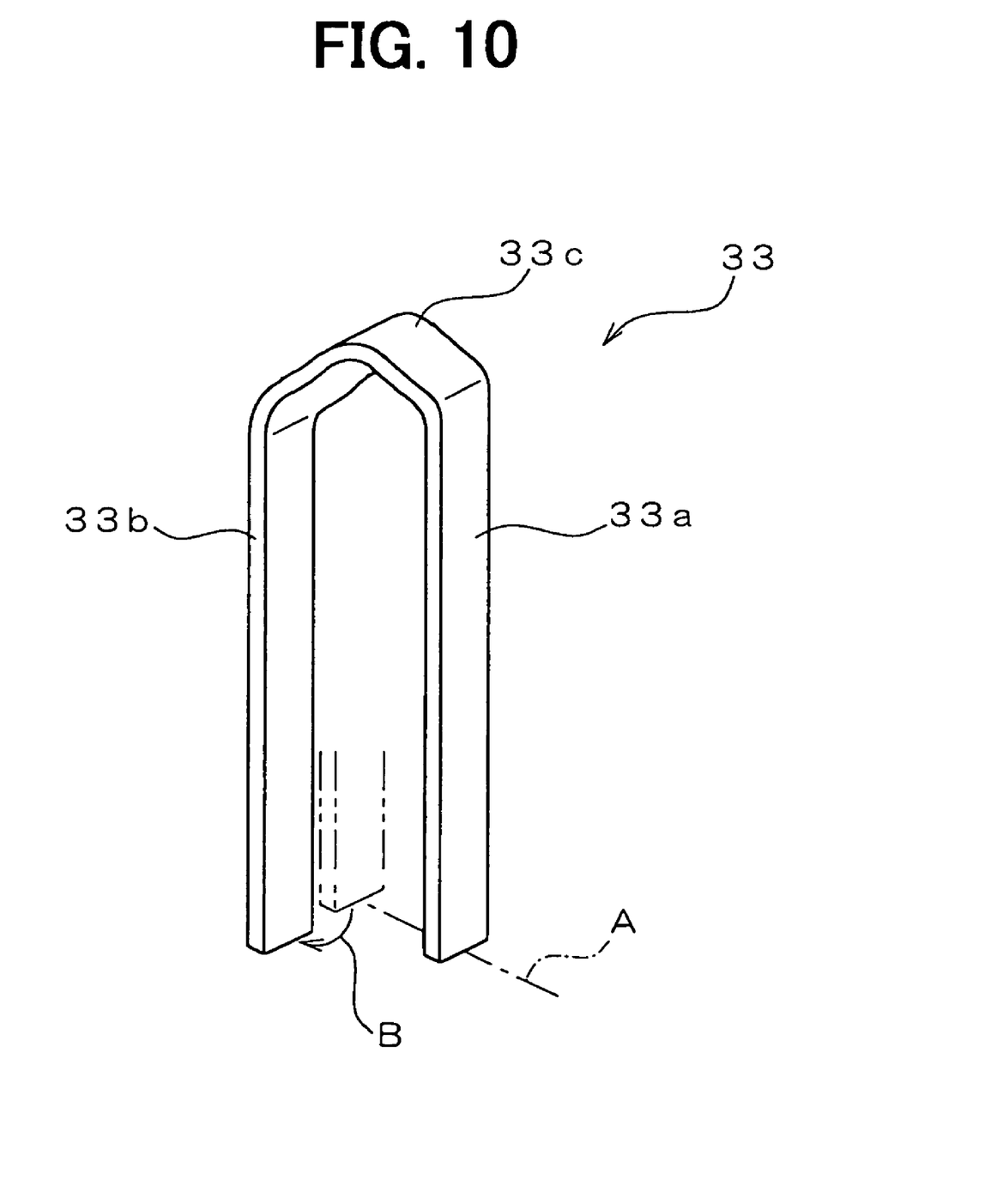
FIG. 10 is a perspective view of a segment twisted in the deforming step.

In the segment 33 after the twist shaping shown in FIG. 10, compared to the segment 33 before twist shaping shown in FIG. 7, one straight portion 33b is shifted in a direction different from the first direction A and the turn portion 33c is twisted.

The deforming step described above is executed against all of the segments 33 composing the segment sets S1 to S4.

(Twisting Step)

Next, a twisting step is executed where the turn portion 33c is twisted by shifting each of the straight portions 33a, 33b toward the opposite direction relative to each other in the circumferential direction in setting the first direction A to the circumferential direction. For example, a case is described to apply twist shaping to two segments 33 (the large and the small segments 331, 332) of the segment set S1 simultaneously.

Figure 11:
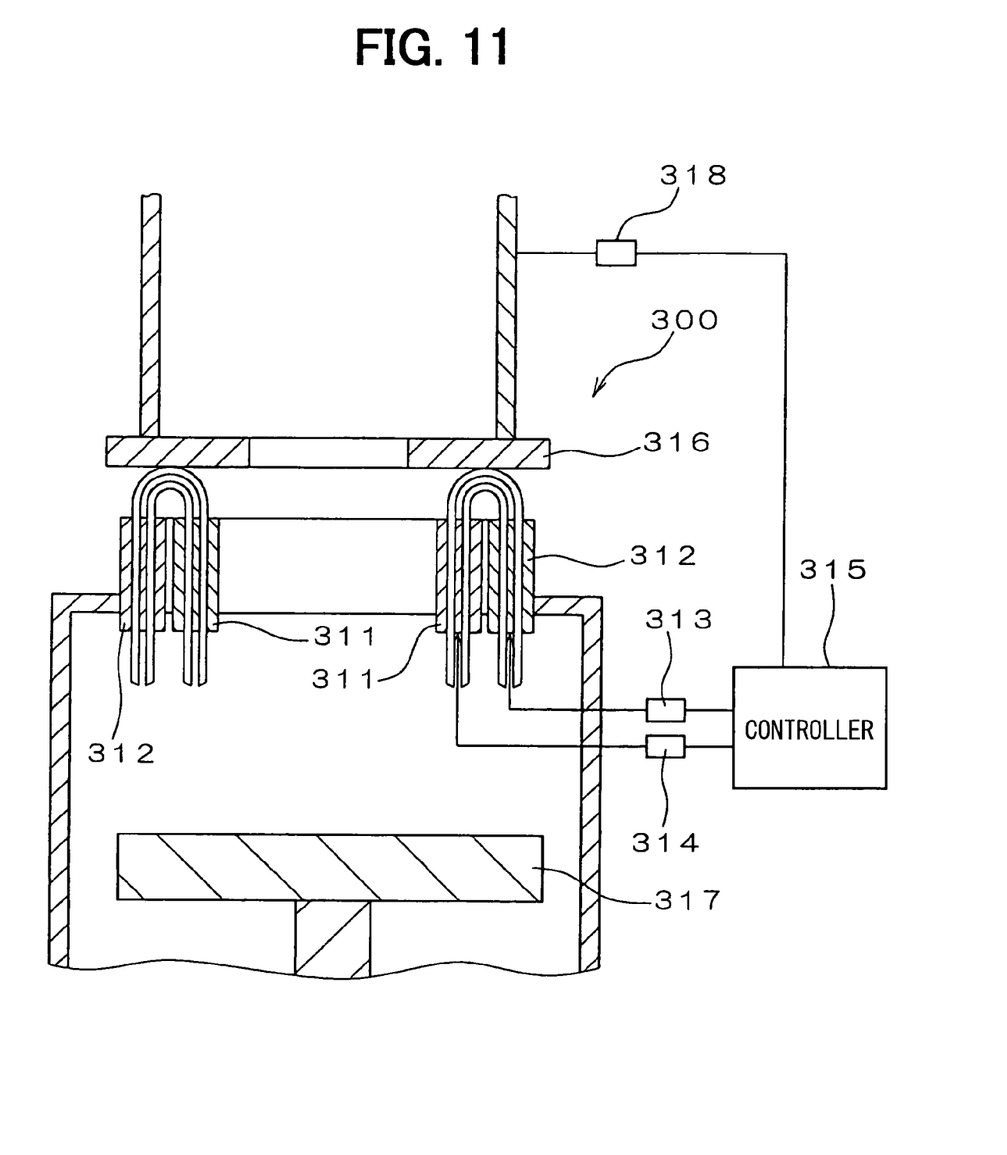
FIG. 11 is a vertical sectional view of a twisting tool used in a twisting step.
Figure 12:
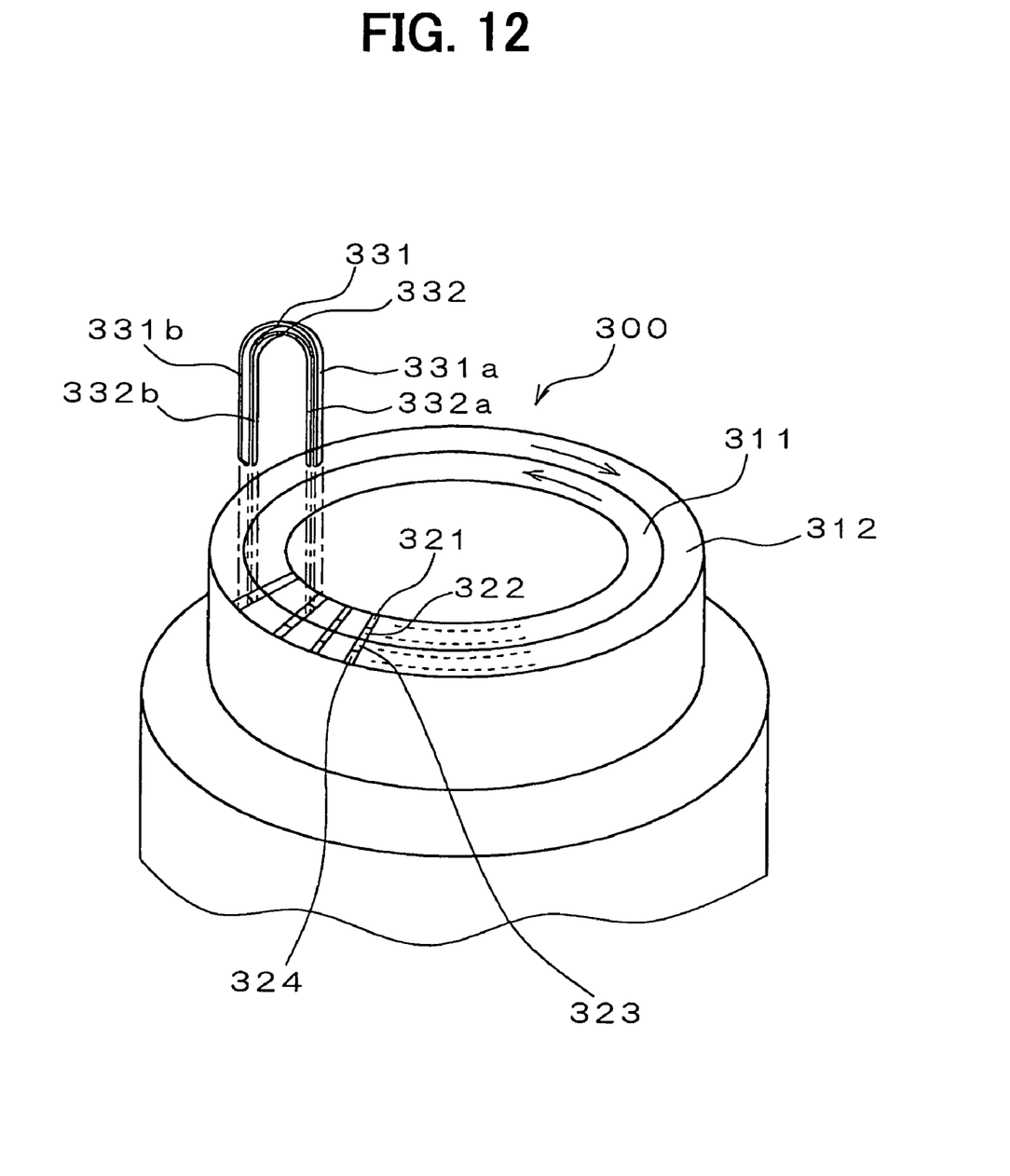
FIG. 12 is a perspective view showing a prime portion of the twisting tool shown in FIG. 11.

As shown in FIGS. 11 and 12, the twisting tool 300 is provided with internal and external twisting portions 311, 312, rotating drive mechanisms 313, 314 which drive these internal and external twisting portions 311, 312 rotationally, a controller 315, a segment retainer 316, a segment lifter 317, a lifting drive mechanism 318, and so on.

The internal twisting portion 311 is provided with segment-inserting holes 321, 322 for inserting and holding the in-slot conductor portions 331a, 332a (the straight portions 33a). The segment-inserting holes 321, 322 are arranged radially with each other. The number of the segment-inserting holes 321, 322 equivalent to that of the slots 35 in the stator core 1 are formed at a constant angular interval along the circumference of the internal and the external twisting portions 311, 312. That is, a plurality of segment-inserting holes 321, 322 are formed at a constant angular interval and coaxially with each other along the circumferences. The external twisting portion 312, similar to the internal twisting portion 311, has the number of segment-inserting holes 323, 324 arranged at a constant angular interval and coaxially with each other along the circumferences. Accordingly, four segment-inserting holes 321, 322, 323, 324 are arranged sequentially in the radial direction on the internal and the external twisting portions 311, 312 before they are rotated.

As shown in FIG. 12, the in-slot conductor portions 331b, 332b, or the straight portions 33b of a pair of the large and the small segments 331, 332, are inserted into the segment-inserting holes 324, 323. The in-slot conductor portions 331a, 332a, or the other straight portions 33a thereof, are inserted into the segment-inserting holes 321, 322 which are adjacent in the circumferential direction to the segment-inserting holes 324, 323 holding the in-slot conductor portions 331b, 331a described above.

After inserting the large and the small segments 331, 332 into all of the segment-inserting holes 321, 322, 323, 324, a ring-shaped segment retainer 316 is lifted down above the internal and the external twisting portions 311, 312 to contact with the turn portion 331c of the large segment 331. Accordingly, it is prevented for the large and the small segments 331, 332 to move out of the segment-inserting holes 321, 322, 323, 324.

Each of the internal and the external twisting portions 311, 312 are rotated in different directions from each other by the rotational driving mechanisms 313, 314 controlled by a controller 315. Seen from the upper side of the twisting tool 300, the internal twisting portion 311 rotates counterclockwise and the external twisting portion 312 rotates clockwise by a given angle respectively. The rotating angle is set in consideration of the arrangement of the straight portions 33a, 33b which are already apart by one pitch of slot arrangement from each other in the state before executing the twisting step.

The two segments 33 of the segment set S4 is subjected to the twisting step in the same way. According to the segment sets S2, S3, one segment 33 is applied the twisting step in the same way such that only the small segment 332 is subjected to the twisting step in FIGS. 11 and 12.

(Inserting Step)

Next, each of the segments twisted in the twisting step is inserted into each of the slots 35 of the stator core 1 from one axial end surface along the axis. In this insertion, as for the segment sets S1, S4, as shown in FIG. 4, the small and the large segments 331, 332 are inserted in the state that the former is surrounded by the latter.

(Folding Step)

After the segments 33 are inserted, the straight portions 33a, 33b protruding of the axial end surface of the stator core 1, or the end portions 331f, 331g, 332f, 332g, at the opposite of the turn portions 33c are folded according to the winding specification of the stator coil 3.

(Connecting Step)

The tips 332d, 332e, 332d, 332e of the end portions 331f, 331g, 332f, 332g of the segments 331, 332 (33) adjacent to each other are connected to flow electricity by means such as welding, ultrasonic welding, arc welding or wax bonding, so that the stator coil 3 is formed having a section shown in FIG. 3.

Figure 13:
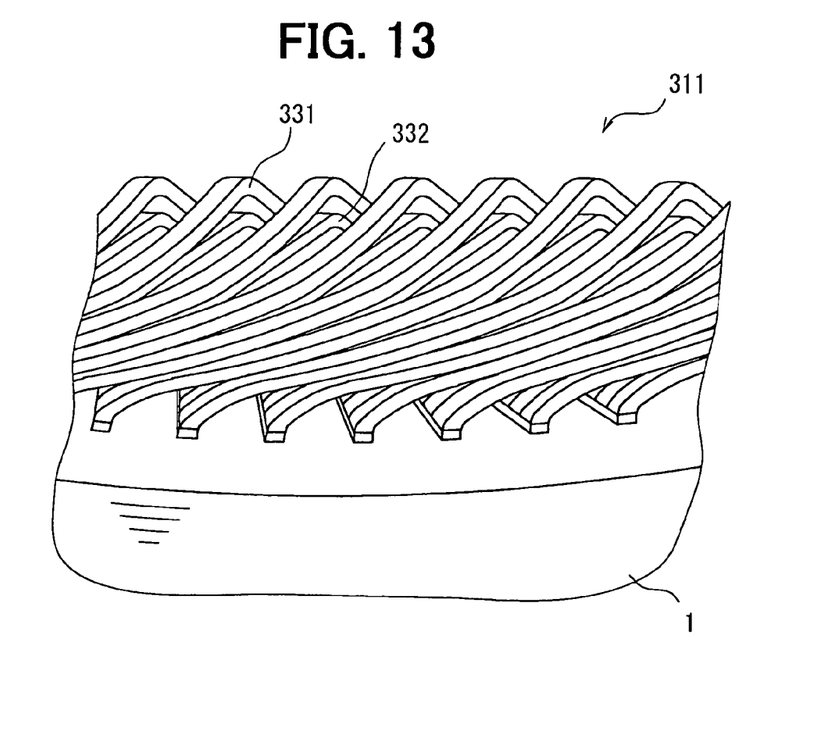
FIG. 13 is a partial perspective view of the stator coil manufactured by the manufacturing stepes of the embodiment.

FIG. 13 shows the shape of the head-turned protruding portion 331 in detail regarding the segment set S4 which is positioned at the most radially outside in the stator coil 3. Each of the segments 33 are processed so that the wire at the turn portions 33c thereof is generally in parallel with the end surface of the stator core 1. Accordingly, the protruding height of the head-turned protruding portion 31 (the height along the rotor shaft 7) is reduced, and this serves to make the driving motor 100 smaller in the axial direction.

As described above, in the stator coil 3 used in the driving motor 100, the U-shaped segment 3 twisted in the twisting step is formed as the straight portions 33a, 33b thereof are shifted in the radial and the circumferential directions in the deforming step which is executed precedingly. Accordingly, even in the case that the two straight portions 33a, 33b is arranged close in the radial direction, it is not necessary to bend the turn portion 33c thereof at an extremely small diameter. Therefore, it becomes possible to restrict for the head-side end portions 31 of the stator coil 3 formed with these segments 33 to bulge in the radial direction.

Especially, the U-shaped segment 33 is formed in the U-shape in a straight rod in the bending step, and the deforming step subsequent to the bending step is executed respectively for each segment 33 one by one, so that the deforming step can be executed adapting to the processing time of the bending step, and the delay of the time by adding the step is limited to a minimum.

The displacement of shifting each of the straight portions 33a, 33b of the segments 33 (especially the small segments 332) in a radial direction in the deforming step is set generally equally with the radial width of the segments 33, so that it is restricted for the head-turned protruding portions 33 to bulge in the radial direction to a minimum.

In the embodiment described above, the large and the small segments 331, 332 in the segment set S1, S4 are manufactured in the same method. However, the large segment 331 may be manufactured in the method of the background art. That is, as for the small segments 332, the end portions bulge in the radial direction if manufactured by the methods shown in the References 1 and 2. This problem does not occur in the large segments 331. Accordingly, by combining the small segments 332 manufactured in the method of this embodiment and the large segments 332 manufactured in the methods of the background arts, it is restricted for the head-turned protruding portions 331 to bulge in the radial direction.

Figure 14:
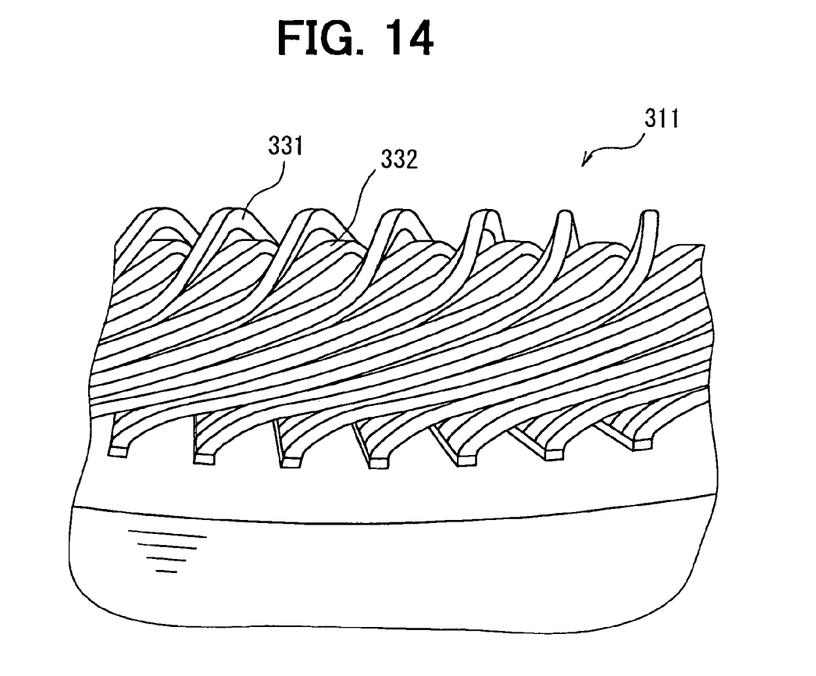
FIG. 14 is a partial perspective view of the stator coil having small segments manufactured by the method of the embodiment and large segments manufactured by a conventional method, closed up to the head-side coil end thereof.

FIG. 14 is a partial perspective view showing the detail of the head-turned protruding portion 31 having the small segment 332 manufactured by the method of this embodiment and the large segment 331 manufactured by the methods of the background arts. In the background arts, the two straight portions 33a, 33b are installed into the twisting tool 300 shown in FIGS. 11 and 12 in the state of being arranged in the radial direction. The side surfaces of the straight portions 33a, 33b just after twisting have the tendency to keep the orientations generally in the circumferential direction. Accordingly, as shown in FIG. 14, in the case that the small segments 332 manufactured by the method of the present embodiment and the large segments 331 manufactured by the method of the background arts are used, it is restricted for the side surfaces of the straight portions of the large segments 331 which are arranged at the most internal and at the most external positions in the head-turned protruding portion 31 to incline to the circumferential direction. This serves the effect to reduce the possibility of the interference with the rotor 2 or the housing 4.

In the embodiment described above, only the turn portion 33c of the segment 33 is retained by the segment retainer 316 not to move in the axial direction in the twisting step. However, it is advantageous to retain the movement of the turn portion 33c also in the radial direction.

Figure 15:
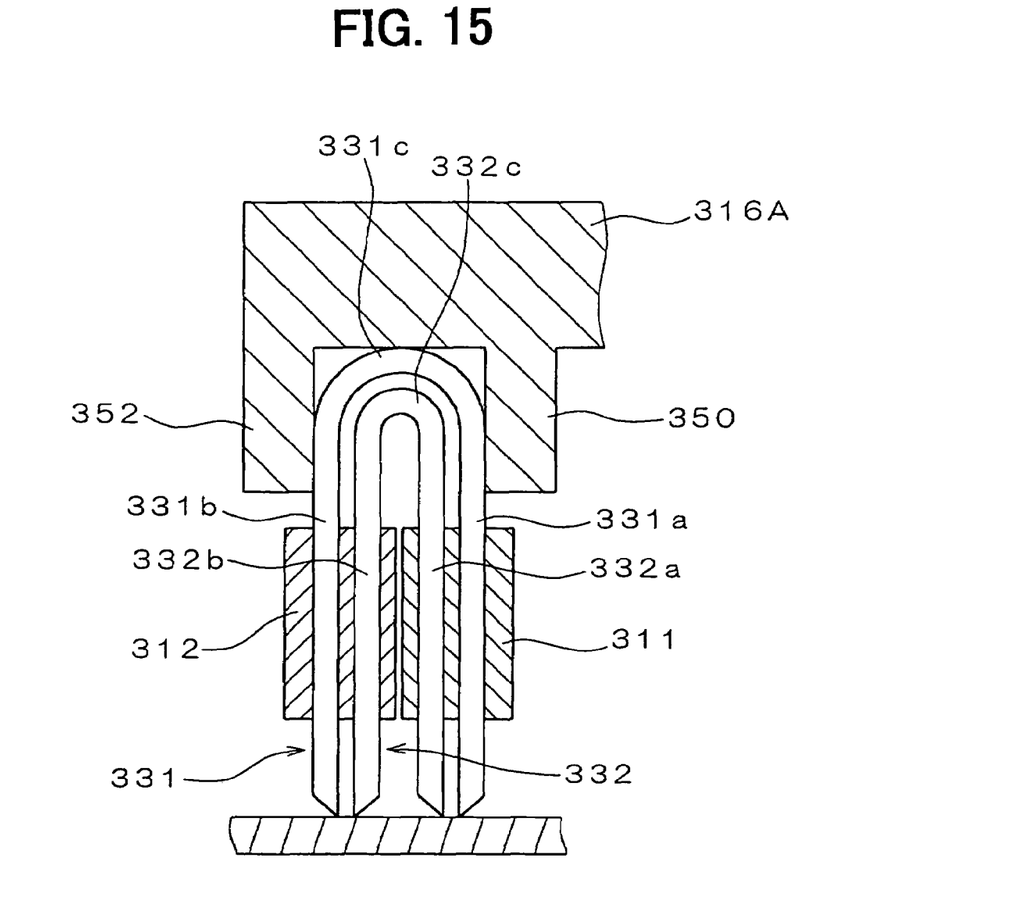
FIG. 15 is a vertical sectional view showing a modified example of the twisting tool whose segment holder is formed in a different shape.

FIG. 15 shows a modified embodiment where the shape of the segment retainer is formed in another shape. The segment retainer 316A shown in FIG. 15 has an internal and an external retaining portions 350, 352 which execute the twist shaping retaining the internal and the external side surfaces of the large segments 331. In the twisting step, if the angle of twisting the straight portions of the segments is large, the turn portions thereof tend to move in the direction connecting the two inserting holes holding the straight portions (to the center in the radial direction). By using the segment retainer 316A described above, these movements can be limited. Accordingly, it is restricted for the turn portions 33c to move in the radial direction and to interfere with the rotor 2 in seeing the segments twisted by the twisting step projected on the radial plane.

Figure 16:
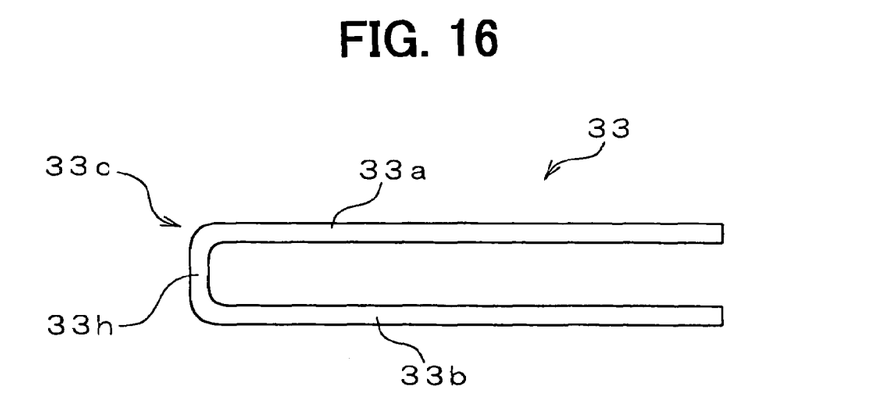
FIG. 16 is a front view showing a modified example of the segment.

In the embodiment described above, a case is described wherein the turn portion 33c of the segment 33 is shaped in an arc with a given diameter. However, the turn portions 33c may have a straight portion therein. FIG. 16 shows a modified example of the segment 33. As shown in FIG. 16, by providing a straight part 33h in the turn portion 33c, only this straight part 33h is twisted into a S-shape, and the deformation of each the straight portions 33a, 33b in the deforming step is reduced.

In the embodiment described above, at the stage where the deforming step is finished, the two straight portions 33a, 33b of the segment 33 are shifted to each other by one pitch of the slots 35 in the first direction A shown in FIG. 9. This shifting displacement may be set larger or smaller than one pitch of the slots 35. However, if the shifting displacement between the two straight portions 33a, 33b in the first direction A is set large and the turn portion 33c is twisted so that the two straight portions 33a, 33b are connected generally straight, the turn portions 33c of the segments 33 adjacent to each other interfere against each other in setting the segments 33 to the twisting tool 300 in the twisting step. Thus, it becomes impossible to execute the step subsequent thereto. To prevent these interferences securely, the shifting displacement between the two straight portions 33a, 33b are desired to be set within one pitch of the slots 33 in the first direction A.

Figure 17:
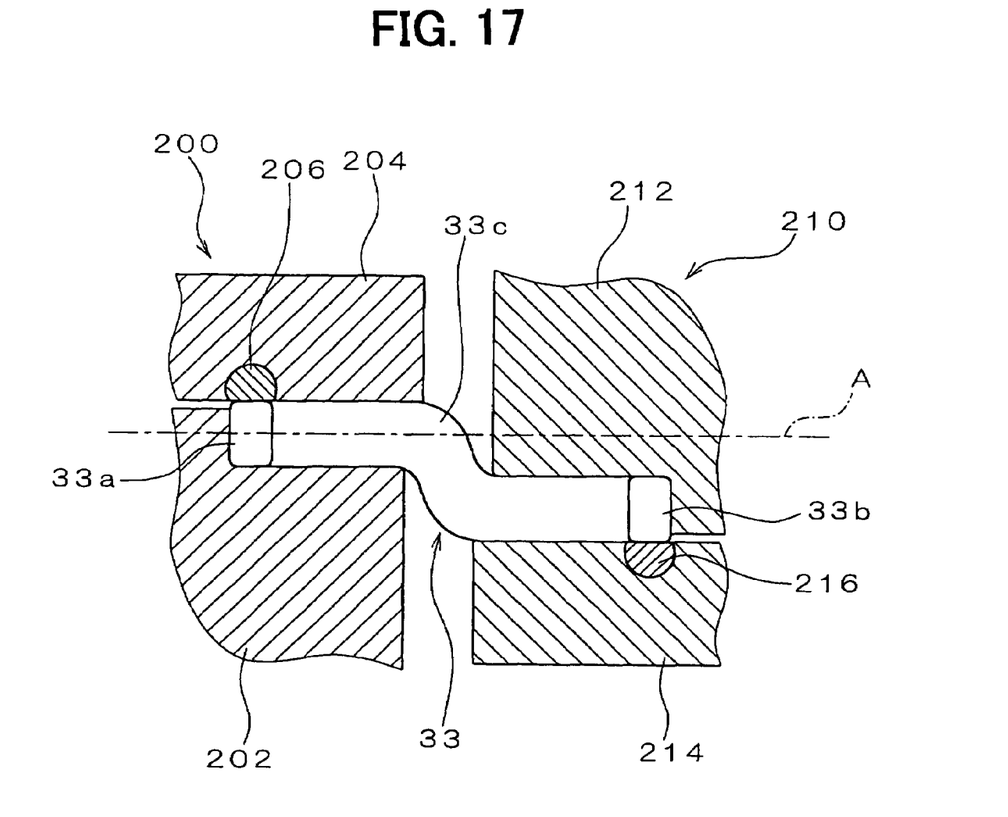
FIG. 17 is a sectional view showing a modified example of a twisting tool used in the deforming step.

Even is the case that the distance between the two straight portions 33a, 33b are set large, by using a retaining tool, the S-shaped part in the deforming step can be limited within one pitch of the slots 35. For example, as shown in FIG. 17, by using the installing unit 202 and the moving unit 204 of the fixed damper 200 as a retaining tool and using the installing unit 212 and the moving unit 214 of the movable damper 210 as a retaining tool, regardless of the shifting displacement between the two straight portions 33a, 33b, the S-shaping width of the turn portion 33c can be set within one pitch of the slots 35. Accordingly, it becomes possible to form the segment 33 having two straight portions 33a, 33b shifted in a large distance to each other. Accordingly, it becomes possible to enlarge the shifting displacement between the two straight portions 33a, 33b gradually and equalize the shifting displacement to that of the segment 33 formed by the twisting step. In this case the twisting step can be omitted and the manufacturing steps becomes simple.

In the embodiment described above, the turn portion 33c is deformed by moving one straight portion 33a against the other straight portion 33b. However, the turn portion 33c can be deformed by shaping processes such as pressuring both sides of the turn portion 33c by molds which deform the turn portion 33c in a predetermined shape.

The deforming step can be executed also by rotating each of the two straight portions 33a, 33b on its axis respectively in the same direction.

Figure 18:
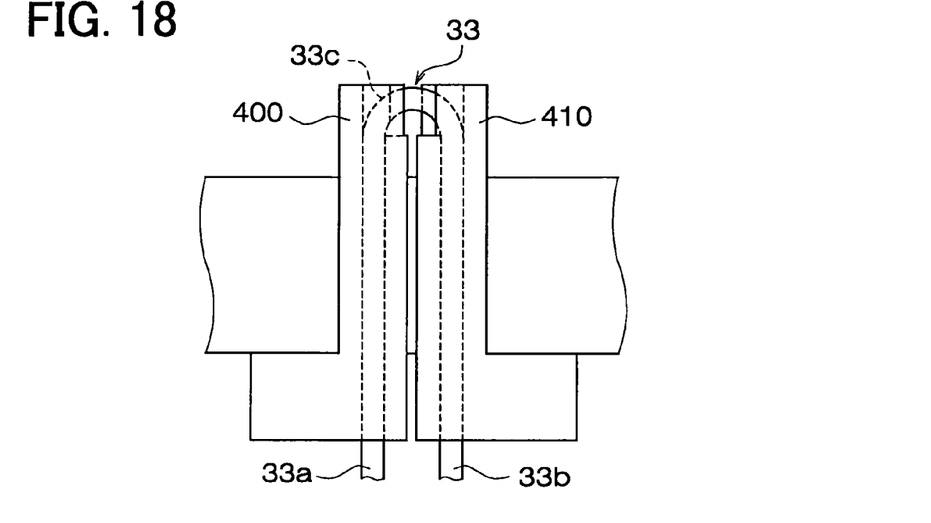
FIG. 18 is a front view of another example of deforming step rotating each of two straight portions of a segment respectively.
Figure 19:
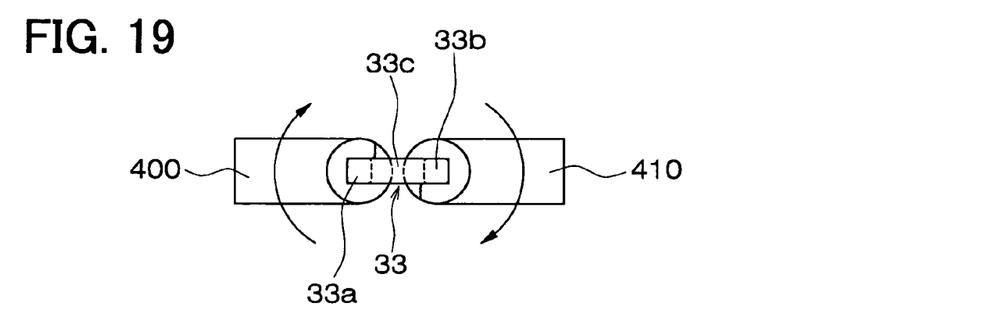
FIG. 19 is a side view of another example of deforming step rotating each of two straight portions of a segment respectively.

As shown in FIGS. 18 and 19, for this method of the deforming step, two rotating tools 400, 410 are used for respectively holding the two straight portions 33a, 33b. Each rotating tool 400, 410 has a through-hole whose internal dimension is slightly larger than each straight portion 33a, 33b which is inserted therein.

Figure 20:
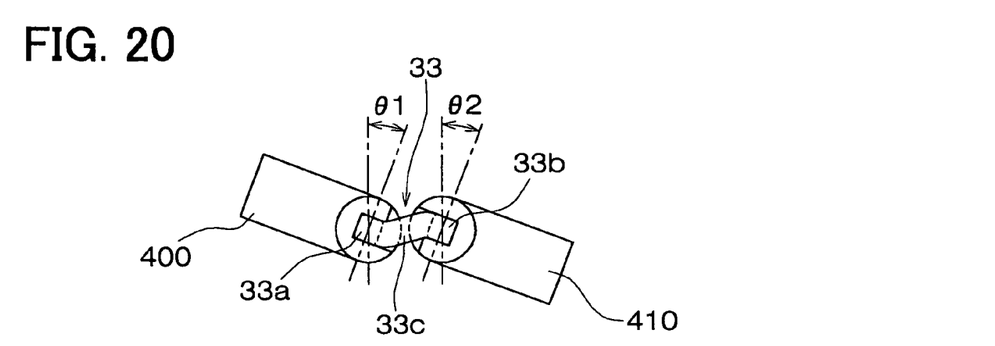
FIG. 20 is a side view of another example of deforming step rotating each of two straight portions of a segment respectively.

In the state that the two straight portions 33a, 33b are inserted in the through-holes of the rotating tools 400, 410, each of the two rotating tools 400, 410 rotates on the axis of the straight portions 33a, 33b inserted therein respectively. The two rotating tools 400, 410 rotate in the same direction shown by arrows in FIG. 19. By rotating the two straight portions 33a, 33b, the segment is deformed as shown in FIG. 20 whose shape is equivalent to that shown in FIG. 10 processed by the deforming step in the main embodiment described above.

The two straight portions 33a, 33b are rotated by angles θ1, θ2 different from each other. Thus, it becomes easier to insert the straight portions 33a, 33b in the respective slots 35 formed radially in a stator core 1.

In the embodiments described above, the case of manufacturing the stator coil 3 used for the driving motor 100 is described, however, this invention can be applied in manufacturing stator coils used for other types of electric rotating machine, such as an AC generator.

What is claimed is:

1. A manufacturing method of a stator coil for a rotary electric machine comprising steps of:
    deforming a turn portion of a U-shaped segment, the U-shaped segment having two straight portions that are generally straight and the turn portion between the straight portions that curves throughout a length of the turn portion, by moving one of the two straight portions with respect to the other of the two straight portions in a direction perpendicular to a direction of the distance between the two straight portions in holding a whole of each of the straight portions; and
    twisting the turn portion by shifting the straight portions apart from each other in the direction of the distance between the two straight portions,
    wherein the deforming step is performed by a clamping device and the twisting step is performed by a twisting device after the deforming step.

2. The manufacturing method according to claim 1, further comprising:
    bending a straight rod into a U-shape of the U-shaped segment before the deforming,
    wherein the deforming is executed for each the segment.

3. The manufacturing method according to claim 1, wherein a moving displacement of the one of the two straight portions in the deforming equals a radial width of the segment arranged in the stator coil.

4. The manufacturing method according to claim 1, wherein a moving displacement of the one of the two straight portions in the deforming is set not more than a pitch of slots formed radially in a stator core at a constant angular interval along a circumference thereof and wherein the straight portions are inserted.

5. The manufacturing method according to claim 1, wherein the twisting is executed simultaneously for a plurality of segments whose number corresponds to a number of slots formed radially in a stator core at a constant angular interval along a circumference thereof and wherein the straight portions are inserted.

6. The manufacturing method according to claim 1, wherein the deforming is to deform the turn portion by a pressure molding.

7. The manufacturing method according to claim 1, wherein the deforming rotates each of the two straight portions on its axis respectively in a same direction.

8. The manufacturing method according to claim 7, wherein the two straight portions are rotated by angles different from each other.

9. The manufacturing method according to claim 1, further comprising:
    inserting the segment into slots formed radially in a stator core at a constant angular interval along a circumference thereof so that the turn portion and end portions of the straight portions opposite to the turn portion protrude from both axial end surfaces of the stator core;
    folding the end portions generally in a circumferential direction of the stator core; and
    connecting tips of the end portions to tips of end portions of other segments.

10. The manufacturing method according to claim 1, further comprising:

inserting a small segment processed by the manufacturing method according to claim 1 and a U-shaped large segment, having two straight portions which are generally straight and a turn portion between the straight portions which curves throughout its length, into slots formed in a stator core so that the small segment is surrounded by the large segment and so that the turn portion and end portions of the straight portions opposite to the turn portion of each of the small and the large segments protrude from both axial end surfaces of the stator core;

folding the end portions generally in a circumferential direction of the stator core; and connecting tips of the end portions to tips of the end portions of other segments.

11. The manufacturing method according to claim 1, wherein during deforming, a first clamper holding one of the two straight portions moves closer to a second clamper holding the other of the two straight portions in the direction of the distance between the two straight portions.

* * * * *